June 14, 1955 A. McNEILL Re. 24,022

CIGARETTE LIGHTER

Original Filed Nov. 13, 1946

Inventor

Angus McNeill

By Wilfred E. Lawson

Attorney

United States Patent Office

Re. 24,022
Reissued June 14, 1955

24,022

CIGARETTE LIGHTER

Angus McNeill, Los Angeles, Calif., assignor to The Parker Pen Company, Janesville, Wis., a corporation of Wisconsin Original No. 2,624,188, dated January 6, 1953, Serial No. 154,237, April 6, 1950, which is a continuation of Serial No. 709,459, November 13, 1946. Application for reissue October 8, 1954, Serial No. 461,301

12 Claims. (Cl. 67—7.1)

Matter enclosed in heavy brackets [ ] appears in the original patent but forms no part of this reissue specification; matter printed in italics indicates the additions made by reissue.

The present invention relates to a cigarette lighter using a revolving piece of flint to rub with its flat end against a friction wheel at one end thereof, thereby producing a spark. This is an improvement over present types of lighters which have a stationary flint which quickly wears down producing a hollow surface. In my lighter, on the other hand, the flint, with its tension spring, is carried in a rotating sleeve with positive mechanical operation, which rotates the flint approximately 15 degrees with each operation of the lighter causing a constantly flat flint head to be presented to the friction wheel, giving said friction wheel a "point" contact with the flint causing a better and more sure spark with each use, as if the flnt were new each time, also causing the spark to travel on a constant tangent towards the wick instead of varying with the amount of concavity of the conventional stationary flint. This also tends to prolong the life of the flint.

The present application is a continuation of my abandoned prior application Serial No. 709,459 filed November 13, 1946.

One embodiment of the invention is illustrated in the drawing wherein like numerals denote the same details in the different views.

Figure 1:
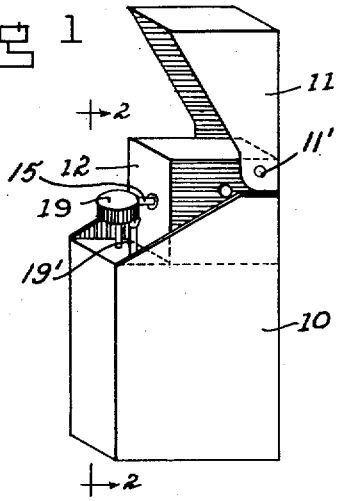
Figure 1 is a perspective view of the lighter open, ready for use.
Figure 2:
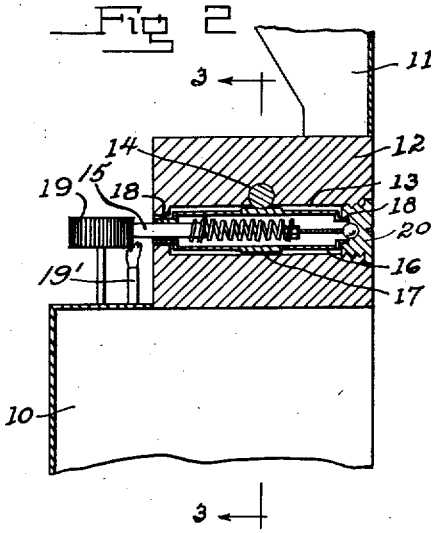
Figure 2 is a fractional, vertical section of the lighter block or body taken on a plane in axial direction of the flint.
Figure 3:
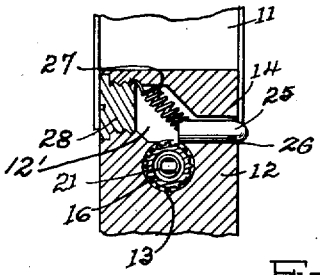
Figure 3 is a similar view of said block or body taken transversely to Figure 2.
Figure 4:
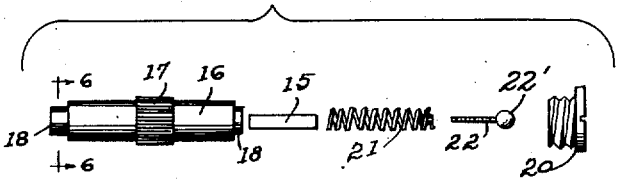
Figure 4 is an exploded view of the flint and details of mounting.
Figure 5:
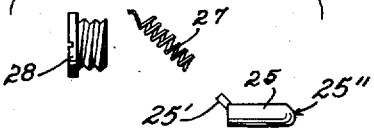
Figure 5 is a similar view of the actuating plunger.
Figure 6:
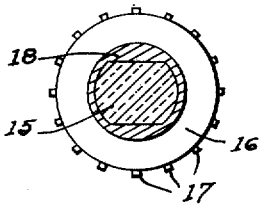
Figure 6 is a sectional view on an enlarged scale, taken on line 6—6 of Figure 4.

In the drawing, reference numeral 10 denotes the casing of the lighter and 11 the cover or hood which is hinged at one of its ends to one of the shorter sides of the top end thereof to enclose the sparking mechanism, when the lighter is not in use.

Mounted on top of the casing 10 is a solid rectangular body 12, which extends inward from the end thereof to which the cover 11 is hinged, as at 11', to a point spaced from a friction wheel 19 that is mounted for rotation adjacent the opposite end of the same. The body 12 is provided with a longitudinal bore 13, extending through the same in line with the friction wheel 19, and with a transverse bore 14 opening through one side thereof and having its inner end communicating with a chamber 12', which has its lower side communicating with the upper side of the bore 13, medially between the ends of the latter.

Housed within the bore 13 is a hollow cylindrical member or sleeve 16, which has its ends formed to a reduced diameter to provide bearing shoulders 18; the inner end of the bore 13 being also similarly reduced to receive the shoulder at the inner end of the sleeve, while the outer end of the bore is closed by a screw plug 20, after the insertion of the sleeve inwardly thereof. The inner end of the screw plug 20 is provided with a circular depression or recess to receive the bearing shoulder 18 at the outer end of the sleeve. Thus, by the provision of the shoulders 18 at the ends of the sleeve 16 any lengthwise shifting of the sleeve is prevented. Formed on the exterior surface of the sleeve 16 is a circular series of elements 17, such as gear teeth or the like, which are positioned on the sleeve so as to be exposed at the opening establishing communication between the top side of the bore 13 and the lower side of the chamber 12' and engaged by the inner end of a plunger 25 slidable relatively thereto in the bore 14; the movement of the plunger, preferably, being such that the sleeve will be turned through fifteen degrees of angular movement, whenever the plunger is actuated.

An elongated flint 15, of rectangular cross-section, has one end engaged in the inner end of a coiled spring 21 and, together with the latter, is inserted inwardly of the outer end of the sleeve 16, upon the removal of the screw plug 20, and projected from the inner end of the sleeve until its forward end bears against the periphery of the friction wheel 19. To maintain the tension of the spring 21, as required to force the flint into contact with the wheel periphery, a screw element 22 is engaged in the outer end of the spring and is provided with a substantially spherical head 22', which has bearing in a second depression or recess formed in the inner end of the screw plug 20 and centrally of the aforesaid circular depression or recess in which the outer end of the sleeve is supported.

Housed within the chamber 12' is a coiled spring 27, which is angularly disposed to have its lower end seated over a lug 25', formed on the upper side of the inner end of the plunger 25, and its upper end engaged in a recess, formed in the outer side wall of the chamber immediately adjacent to an opening leading from the latter through said wall for convenience in the removal and replacement of the spring when necessary, the opening being normally closed by a screw plug 28. With the cover 11 normally closed, the plunger 25 is held at its innermost position by the engagement of its outer end with the adjacent side wall of the cover. In this position of the plunger 25, the spring 27 is held under tension so as to force the plunger outwardly of the bore 14 to position its outer end in the path of movement of said side wall, whenever the cover is moved to open position; the bore 14 being formed to provide a slight clearance above the plunger 25 to allow its inner end to ride over the gear teeth 17 during such movement. The outward movement of the plunger 25, under the urging of the spring 27, is limited by oppositely beveled surfaces formed at the upper sides of the outer ends of the bore 14 and the plunger, the latter otherwise being rounded off to facilitate the movements of the side wall of the cover relatively thereto.

Due to the angular disposition of the spring 27, its resiliency allows for the upward movement of the inner end of the plunger 25 necessary for it to ride back over the teeth 17 during the movement of the same outwardly of the bore 14 and, at the same time its expansion effort on the inner end of the plunger, when the outer end of the latter is cleared by the cover wall, acts to force the outward movement thereof as well as to maintain it in proper position for its inner end to engage the toothed portion of the sleeve 16, when the cover is returned to closed position.

A wick tube 19' opens into the casing 10 and rises from its top wall in the plane of the tangential discharge of sparks produced by the manipulation of the friction wheel 19 relatively to the end of the flint 15 forcibly contacting the periphery of the wheel by the action of the spring 21.

When the hood 11 is closed, the plunger 25 will then be pushed back against the pressure of the spring 27 and revolve the sleeve 16 with the flint.

I claim:

1. In a friction lighter of the type having a support, a friction wheel carried on said support, a flint movable into abutment with said wheel, feed means resiliently urging said flint against said wheel, a fuel reservoir having means for conducting fuel therefrom positioned substantially in the path of sparks produced by rotation of said wheel against said flint, and a cover pivoted to said support for movement between closed position enclosing said wheel, flint and fuel conducting means and open position exposing said latter elements, in combination, means supporting said flint for sliding feed movement toward said wheel and for rotation about the feed axis of said flint, and means for rotating said flint including a driving element actuated by said cover in moving from one to another of its said two positions.

2. In a friction lighter of the type having a support, a friction wheel carried on said support, a flint movable into abutment with said wheel, feed means resiliently urging said flint against said wheel, a fuel reservoir having means for conducting fuel therefrom positioned substantially in the path of sparks produced by rotation of said wheel against said flint, and a cover pivoted to said support for movement between closed position enclosing said wheel, flint and fuel conducting means and open position exposing said latter elements, in combination, a guide for said flint carried by said support for rotation about the axis of said flint and guiding said flint for sliding feed movement by said feed means, said guide holding said flint for rotation therewith, a driven element rotatable as a unit with said guide, and means including a driving element actuated by said cover in moving from one to another of its said two positions for turning said driven element, and thereby said guide and flint, a predetermined extent about said axis.

3. In a cigarette lighter, a casing, a hinged cover normally enclosing the top end of said casing, a friction wheel mounted for rotation on the top end of said casing, a tubular member mounted for rotation on the top end of said casing, a flint projecting from one end of said tubular member and into contacting relation with the periphery of said wheel, a spring housed within said tubular member to maintain said flint in contact with the wheel periphery, means actuated by closing movements of said cover to impart limited turning movements to said tubular member and said flint to change the contacting relation of the latter with respect to the wheel periphery, and a fuel reservoir having means for conducting fuel therefrom supported in the plane of the tangential discharge of sparks emitted from the contacting end of said flint.

4. The invention as defined in claim 3, with a substantially rectangular body mounted on the top end of said casing at one side of said friction wheel and having said tubular member housed within a bore extending longitudinally through the same, said body having a second bore extending transversely inward of one side thereof, the inner end of said second bore being in communication with the top side of said longitudinal bore, a circular series of abutments formed on the exterior of said tubular member and adapted to move through the plane of the bottom side of said second bore whenever the tubular member is rotated, a plunger slidable in said second bore for the cooperation of its inner end with said abutments to affect the turning of said tubular member and said flint, and a spring housed within said body and adapted to cooperate with the inner end of said plunger to urge the same outwardly of said second bore whenever said cover is swung to open position whereby the outer end of the plunger is disposed in the path of closing movement of the cover, said plunger being forced inwardly against the tension of said spring and into engagement with the nearest of said abutments upon the closing of said cover.

5. A lighter comprising a body, a fuel reservoir depending from said body, means for conducting fuel out of said reservoir, a flint, means on said body slidably carrying said flint and rotatable therewith about the axis of the flint, a friction element, means mounting said friction element on said body for movement across and in contact with said flint in a direction to strike and throw a spark into the fuel at said fuel-conducting means, resilient means for feeding the flint in said flint carrying means into position for contact with said friction element, means on said body operative independently of the feed of said flint for turning said flint carrying means and the flint carried thereby about the axis of the flint to present said flint to said friction member in progressively different rotational positions, and operator controlled means for actuating said rotating means on said body.

6. A lighter comprising a casing, a fuel reservoir in said casing, means for conducting fuel out of said reservoir, a flint, means slidably carrying said flint and rotatable therewith about the axis of the flint, a friction element, means mounting said friction element for movement across and in contact with said flint in a direction to strike and throw a spark into the fuel at said fuel conducting means, resilient means for feeding the flint in said flint carrying means into position for contact with said friction element, a cover supported on said casing for movement between a closed position enclosing at least said fuel conducting means and open position exposing said fuel conducting means, means operative independently of the feed of said flint for turning said flint carrying means and the flint carried thereby about the axis of the flint to present said flint to said friction member in progressively different rotational positions, and means actuated by movement of said cover from one to the other of its two said positions for actuating said turning means.

7. In a lighter of the type having a body, a fuel reservoir depending from said body, means for conducting fuel from said reservoir, a flint, a friction element rotatably carried on said body for movement across and in contact with said flint in a direction to throw a spark into fuel at said fuel conducting means, feed means resiliently urging said flint into position to be engaged by said friction element, in combination, a guide means for said flint carried by said body for rotation about the longitudinal axis of said flint and guiding said flint for longitudinal sliding feed movement by said feed means, said guide holding said flint for rotation therewith, a driven element unitary with said guide means and rotatable about said axis and having a series of abutments thereon, and means including a driving element carried by said body in position for predetermined movement in positive driving engagement with the abutments of said driven element for turning the latter about its axis and thereby said guide and flint to an extent corresponding to the movement of said driving element and a pivotally mounted operator-controlled member for actuating said driving element.

8. A lighter comprising a body, a fuel reservoir, depending from said body, means for conducting fuel out of said reservoir, a flint means rotatably carried in said body and slidably supporting said flint for rotation therewith about the axis of the flint, a friction element, means mounting said friction element on said body for movement across and in contact with said flint in a direction to strike and throw a spark into the fuel at said fuel-conducting means, spring means on said body for slidably urging said flint in said carrying means into contact with said friction element independently of the turning movement of said flint, means for turning said flint-carrying means and the flint carried thereby about the axis of the flint to present said flint to said friction element in progressively different rotational positions and an operated member pivotally mounted on said body for actuating said turning means.

*9. In a pyrophoric lighter, the combination comprising a casing, a tubular flint holder having a toothed circumferential portion and being carried by the casing for rotation about the holder's central longitudinal axis, means associated with the flint holder for constraining a flint held by the latter to rotate coaxially therewith and for urging such a flint forwardly in an axial direction relatively to said flint holder, the said flint holder being free to so rotate irrespective of such forward movement of the flint, means for restraining the flint holder against material movement other than said rotational movement, an abrasive wheel carried by the casing in position for its periphery to sparkingly engage an adjacent end of a flint thus held by the flint holder, a flint holder rotating member which is necessarily movable manually as a part of complete operation of the lighter and is carried by the casing and has a projection thereon adapted, upon movement of said member, to engage said toothed circumferential portion of the flint holder to thus rotate the latter and a flint held thereby to present different lines of contact of the flint, at its said end, with the periphery of the abrasive wheel, in successive operations of the lighter.*

*10. In a pyrophoric lighter, the combination comprising a casing and a flint holder carried by said casing for movement which is solely rotational movement relatively to the casing, the said flint holder having a toothed portion in coaxial relationship to said flint holder's axis of such rotation, means for carrying a flint in a position coaxial to said axis of rotation and means for constraining a flint thus carried to rotate with the flint holder and for urging such a flint forwardly in an axial direction relatively to said flint holder, the said flint holder being free to so rotate irrespective of such forward movement of the flint; the combination further comprising an abrasive wheel carried by the casing in position for its periphery to sparkingly engage an adjacent end of a flint thus carried, and a flint holder rotating member which is necessarily movable manually as a part of complete operation of the lighter and is carried by the casing and has a projection thereon adapted, upon movement of said member, to engage said toothed portion of the flint holder to thus rotate the latter and a flint carried thereby to present different lines of contact of the flint, at its said end, with the periphery of the abrasive wheel, in successive operations of the lighter.*

*11. In a pyrophoric lighter, the combination comprising a casing, a tubular flint holder carried by the casing for rotation about the holder's central longitudinal axis, and having a generally cylindrical circumferential drive portion for receiving driving movement for imparting such rotation to the flint holder, means associated with the flint holder for constraining a flint held by the latter to rotate coaxially therewith and for urging such a flint forwardly in an axial direction relatively to said flint holder, the said flint holder being free to so rotate irrespective of such forward movement of the flint, an abrasive wheel carried by the casing in position for its periphery to sparkingly engage an adjacent end of a flint thus held by the flint holder, and a flint holder rotating member which is necessarily movable manually as a part of complete operation of the lighter and is carried by the casing and coacts with said drive portion, upon movement of said member, to rotate the flint holder and a flint held thereby to present different lines of contact of the flint at its said end, with a periphery of the abrasive wheel, in successive operations of the lighter.*

*12. In a pyrophoric lighter, the combination comprising a casing and a flint holder carried by the casing for rotation relatively to said casing and having an irregular, circumferential drive surface, coaxial to said flint holder's axis of rotation, for receiving driving movement for imparting such rotation to the flint holder, means for carrying a flint in a position coaxial to said axis of rotation and means for constraining a flint thus carried to rotate with the flint holder and for urging such a flint forwardly in an axial direction relatively to said flint holder, the said flint holder being free to so rotate irrespective of such forward movement of the flint; the combination further comprising an abrasive wheel carried by the casing in position for its periphery to sparkingly engage an adjacent end of a flint thus carried, and a flint holder rotating member which is necessarily movable manually as a part of complete operation of the lighter and is carried by the casing and coacts with said drive portion, upon movement of said member, to rotate the flint holder and a flint held thereby to present different lines of contact of the flint at its said end with the periphery of the abrasive wheel, in successive operations of the lighter; the said casing and flint holder having interengaging shoulder portions for restraining the said flint holder against material movement longitudinally of its said axis of rotation in a direction away from said abrasive wheel.*

References Cited in the file of this patent or the original patent

UNITED STATES PATENTS

| | | |
|---|---|---|
| 1,027,900 | Ramsdell | May 28, 1912 |
| 1,464,203 | Hutchinson | Aug. 7, 1923 |
| 1,762,281 | Stecker | June 10, 1930 |
| 1,906,217 | Scully | Apr. 25, 1933 |

FOREIGN PATENTS

| | | |
|---|---|---|
| 297,188 | Great Britain | Sept. 20, 1928 |
| 917,306 | France | of 1946 |